(12) United States Patent
Mechelke et al.

(10) Patent No.: US 8,645,944 B2
(45) Date of Patent: Feb. 4, 2014

(54) DEPLOYMENT OF A SOLUTION ARTIFACT TO A CLIENT APPLICATION

(75) Inventors: Thomas Alexander Josef Mechelke, Seattle, WA (US); Jiajun Hua, Redmond, WA (US); Alexandru Croicu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 12/193,050

(22) Filed: Aug. 18, 2008

(65) Prior Publication Data

US 2010/0042604 A1 Feb. 18, 2010

(51) Int. Cl.
*G06F 9/445* (2006.01)

(52) U.S. Cl.
USPC .......................................................... 717/174

(58) Field of Classification Search
USPC .......................................................... 717/174
See application file for complete search history.

(56) References Cited

U.S. PATENT DOCUMENTS

| 6,282,711 B1 | 8/2001 | Halpern et al. |
| 6,618,857 B1 | 9/2003 | Zimniewicz et al. |
| 6,901,590 B2 | 5/2005 | Narayanaswamy et al. |
| 6,948,151 B2 | 9/2005 | Gerken |
| 7,089,548 B2 | 8/2006 | Lin |
| 2005/0071736 A1* | 3/2005 | Schneider et al. ............ 715/500 |
| 2005/0132359 A1 | 6/2005 | McGuire et al. |
| 2006/0031371 A1 | 2/2006 | Uthe |
| 2006/0123410 A1 | 6/2006 | Kapoor |
| 2006/0168512 A1 | 7/2006 | Wilson et al. |
| 2006/0230389 A1* | 10/2006 | Moulckers et al. ........... 717/127 |
| 2007/0169103 A1* | 7/2007 | Bhatkhande et al. ......... 717/170 |
| 2007/0169109 A1 | 7/2007 | Neswal |
| 2008/0109801 A1* | 5/2008 | Levine et al. ................. 717/171 |
| 2009/0119643 A1* | 5/2009 | Sriramadhesikan et al. . 717/121 |

OTHER PUBLICATIONS

"Deploy and Update Your Smart Client Projects Using a Central Server", retrieved at <<http://msdn2.microsoft.com/en-us/magazine/cc163973.aspx>>, Apr. 24, 2008, pp. 1-7.
Ivan , et al.,"Partitionable Services: A Framework for Seamlessly Adapting Distributed Applications to Heterogeneous Environments", "Proceedings of the 11 th IEEE International Symposium on High Performance Distributed Computing HPDC-11 2002 (HPDC'02)", 2002, pp. 1-10.
Dolstra, "Efficient Upgrading in a Purely Functional Component Deployment Model", retrieved at<<http://www.st.ewi.tudelft.nl/~dolstra/pubs/eupfcdm-cbse2005-final.pdf>>, pp. 1-16.

* cited by examiner

*Primary Examiner* — Li B Zhen
*Assistant Examiner* — Arshia S Kia
(74) *Attorney, Agent, or Firm* — Tim Wong; Jim Ross; Micky Minhas (57) ABSTRACT

Technologies are described herein for deploying a solution artifact to a client-side application. In one method, an instruction to deploy the solution artifact to the client-side application program is received. Upon receiving the instruction, a determination is made whether a package associated with the solution artifact and the client-side application program was generated. Upon determining that the package was generated, a determination is made whether the package is current. Upon determining that the package is not current or that the package was not generated, the package is generated based on the solution artifact and the client-side application program. Upon determining that the package is current or upon generating the package, the package is deployed to the client-side application program.

18 Claims, 6 Drawing Sheets

DEPLOYMENT OF A SOLUTION ARTIFACT TO A CLIENT APPLICATION

BACKGROUND

Data that is provided for multiple users is often stored on and accessed through a backend server. The data may be accessed through applications executing on the server side and the client side. For example, the user may view, through a web browser, a list of orders presented on a web page. The list of orders presented on the web page may be remotely provided through an enterprise network or the Internet.

A user who finds and views data stored on the backend server may desire to view the data locally through client applications executed on client computers. However, the data may not be provided in a way that is viewable and/or accessible through certain client applications. For example, if the user wants to view the web-based sales data through a local email application, for example, the user may have no easy way to deploy the list of orders for optimal viewing and interaction through the email application. In some cases, deploying the list of orders from the web page to the email application may require a significant understanding of programming. However, for most non-sophisticated computer users (e.g., typical business users), deploying the list of orders from the web page to the email application may be technically difficult and overly time consuming.

It is with respect to these considerations and others that the disclosure made herein is presented.

SUMMARY

Technologies are described herein for deploying a solution artifact configured in one representation to a client application operating under another representation. In particular, a user who is viewing, over a network, a solution artifact provided by a backend server may instruct a deployment mechanism to take the data offline. The deployment mechanism may then process the solution artifact to create a package associated with a client application and deploy, over the network, the package to the client application. As used herein, a solution artifact may refer to any organized collection of data, such as a list or a form.

The package may include application-specific metadata files and a solution manifest file. The application-specific metadata files include the same data as provided by the solution artifact. Unlike the solution artifact, however, the application-specific metadata files are configured in a representation fully compatible with the client application, thereby enabling optimal access to the data through the client application. The solution manifest file informs the client application how the application-specific metadata files are to be installed and maintained. Upon installing the application-specific metadata files, the client application can access offline the data in the application-specific metadata files.

According to one embodiment presented herein, technologies are provided for deploying a server-side solution artifact to a client-side application program operating in a second representation. The technologies receive an instruction to deploy the solution artifact to the client-side application program. Upon receiving the instruction, the technologies determine whether a package associated with the solution artifact and the client-side application program was generated.

If the package was not generated, then the technologies determine whether the package is current. If the package is not current or if the package was not generated, then the technologies generate the package based on the solution artifact and the client-side application program. If the package is current or upon generating the package, the technologies deploy the package to the client-side application program.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for deploying a solution artifact configured in one representation to a client application operating under another representation. In particular, a package is generated based on a given client application and is deployed to the given client application. The package enables a user to access the same data provided by the solution artifacts through the given client application.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
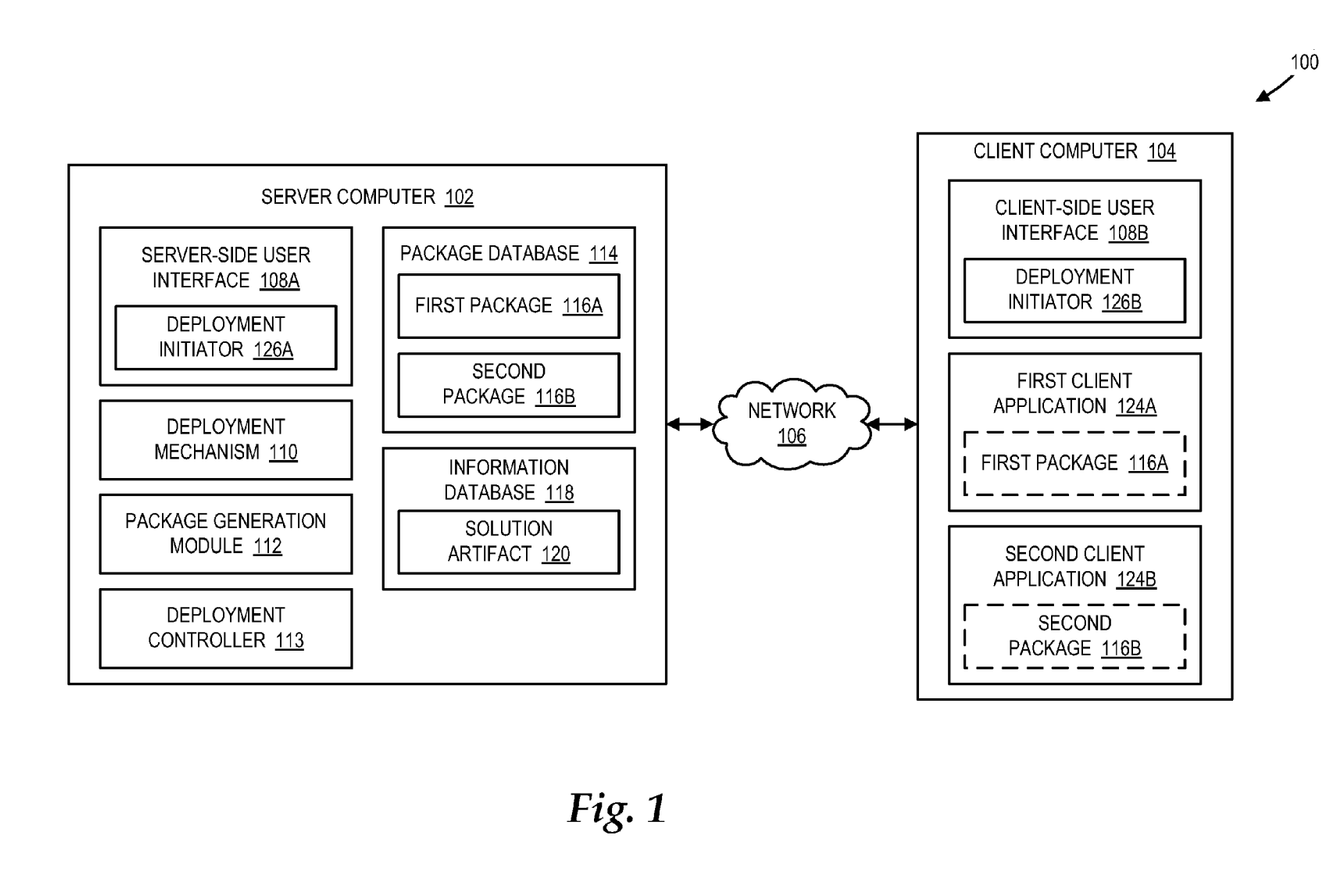
FIG. 1 is a network architecture diagram operative to deploy a solution artifact to a client-side application program, in accordance with one embodiment.

In the following detailed description, references are made to the accompanying drawings that form a part hereof, and which are shown by way of illustration specific embodiments or examples. Referring now to the drawings, in which like numerals represent like elements through the several figures, a computing system and methodology deploying a solution artifact will be described. FIG. 1 shows an illustrative network architecture 100 operative to implement an embodiment of a deployment controller, such as a deployment controller 113, as described herein. In particular, the network architecture 100 includes a server computer 102 and a client computer 104, both of which are operatively coupled via a network 106. For the sake of simplicity, only one server computer and one client computer are illustrated in FIG. 1. However, it should be appreciated that any suitable number of server computers and client computers may be included in the network architecture 100 according to other embodiments. The network 106 may be any suitable network, such as a local area network ("LAN") or the Internet. In one embodiment, the network 106 is a private network, such as an enterprise network.

The server computer 102 includes a server-side user interface 108A, a deployment mechanism 110, a package generation module 112, the deployment controller 113, a package database 114, and an information database 118. Although the package database 114 and the information database 118 are illustrated in FIG. 1 as being locally connected to the server computer 102, it should be appreciated that the package database 114 and/or the information database 118 may also be located remotely and accessed through the network 106 or other suitable network. Further, the server computer 102 may include a web server (not shown) enabling the client computer 104 to access the server computer 102 via a uniform resource locator ("URL"), for example. The client computer 104 includes a client-side user interface 108B, a first client application 124A, and a second client application 124B. The first client application 124A and the second client application 124B may be collectively referred to herein as client applications 124.

The server-side user interface 108A comprises any suitable application accessed locally at the server computer 102. For example, the server computer 102 may include one or more input devices (not shown in FIG. 1), such as a keyboard and/or mouse, and one or more output devices (also not shown in FIG. 1), such as a screen display, for interacting with the server-side user interface 108A. In one embodiment, the server-side user interface 108A is a web browser or other web-based application operative to access (e.g., view, interact with, modify, etc.) a solution artifact 120 stored in the information database 118. In other embodiments, the server-side user interface 108A may be a dedicated or proprietary application for accessing the solution artifact 120.

As used herein, a solution artifact 120 refers to any organized collection of data, such as a list or a form. The solution artifact 120 is configured in a representation that may or may not be fully compatible with the client applications 124. That is, the client applications 124 may or may not have sufficient capability to fully or optimally access the solution artifact 120. An example of a list is a SHAREPOINT LIST created under MICROSOFT SHAREPOINT browser-based collaboration and document management platform or MICROSOFT SHAREPOINT DESIGNER web design application, both of which are from MICROSOFT CORPORATION. An example of a form is an INFOPATH FORM created under MICROSOFT OFFICE INFOPATH information-gathering program application MICROSOFT CORPORATION. While these examples are provided to facilitate this description, other examples of artifacts, lists, or forms may be included in implementations without departing from the scope and spirit of this description.

The client-side user interface 108B comprises any suitable application accessed locally at the client computer 104. For example, the client computer 104 may include one or more input devices (not shown in FIG. 1), such as a keyboard and/or mouse, and one or more output devices (also not shown in FIG. 1), such as a screen display, for interacting with the client-side user interface 108B. In one embodiment, the client-side user interface 108B is also a web browser or other web-based application operative to access the solution artifact 120 stored in the information database 118.

According to embodiments, the server-side user interface 108A and the client-side user interface 108B (collectively referred to herein as user interfaces 108) include deployment initiating elements 126A, 126B (generically referred to as deployment initiating element 126), which enable a user to initiate the deployment mechanism 110. For example, the deployment initiating element 126 may be an interface element (e.g., a button, a drop-down menu, etc.) that is selectable and is capable of being activated via a keyboard, mouse, or other suitable input device. In one embodiment, the deployment initiating element 126 includes a selection mechanism (not shown in FIG. 1) that further enables the user to select client applications for which packages are created and to which the packages are deployed. In other embodiments, client applications may be pre-selected by the user or other suitable entity.

Examples of client applications include the client applications 124. Examples of packages include a first package 116A and a second package 116B (collectively referred to as packages 116). As illustrated in FIG. 1, the first package 116A is represented in a solid line in the package database 114 and in a dotted line in the first client application 124A. Similarly, the second package 116B is represented in a solid line in the package database 114 and in a dotted line in the second client application 124B. The solid line representations of the packages 116 in the package database 114 show the storage of the packages 116 after their generation. The dotted line representations of the packages 116 in the client applications 124 show the packages 116 after their deployment to the client applications 124.

According to embodiments, the client applications 124 may be any suitable client applications. For example, the client applications 124 may include office productivity applications, communication applications (e.g., an email application), and collaboration applications. Each of the packages 116 is associated with at least one of the client applications 124. As illustrated in FIG. 1, the first package 116A is associated with the first client application 124A, and the second package 116B is associated with the second client application 124B.

According to embodiments, each of the packages 116 includes one or more application-specific metadata files and a solution manifest file (not shown in FIG. 1). The application-specific metadata files provide the same data as provided by the solution artifact 120 to an associated client application. In particular, the application-specific metadata files enable a user to access (e.g., view, interact with, modify, etc.) this data through the associated client application. For example, the application-specific metadata files may be configured in a representation compatible with the associated client application. The solution manifest file informs the associated client application how the application-specific metadata files are to be installed and maintained.

Upon initiation by the user, the deployment mechanism 110 determines whether the packages 116 have been previously created by checking the package database 114 and if the packages have been previously created, whether the packages 116 are current. The packages 116 that have already been created are stored in the package database 114. The packages 116 are current if they reflect the most recent update of the solution artifact 120. If the packages 116 have been created and are current, then the deployment mechanism 110 deploys the packages 116 to the client applications 124. However, if the packages 116 have not been created or are not current (i.e., outdated), then the deployment mechanism 110 instructs the package generation module 112 to generate the packages 116. Once the package generation module 112 generates the packages 116 and stores the packages 116 in the package database 114, the deployment mechanism 110 deploys the packages 116 to the client applications 124. Once the packages 116 are deployed to the client applications 124, users may utilize the client applications 124 to access offline data in the application-specific metadata files as provided through the packages 116.

Figure 2:
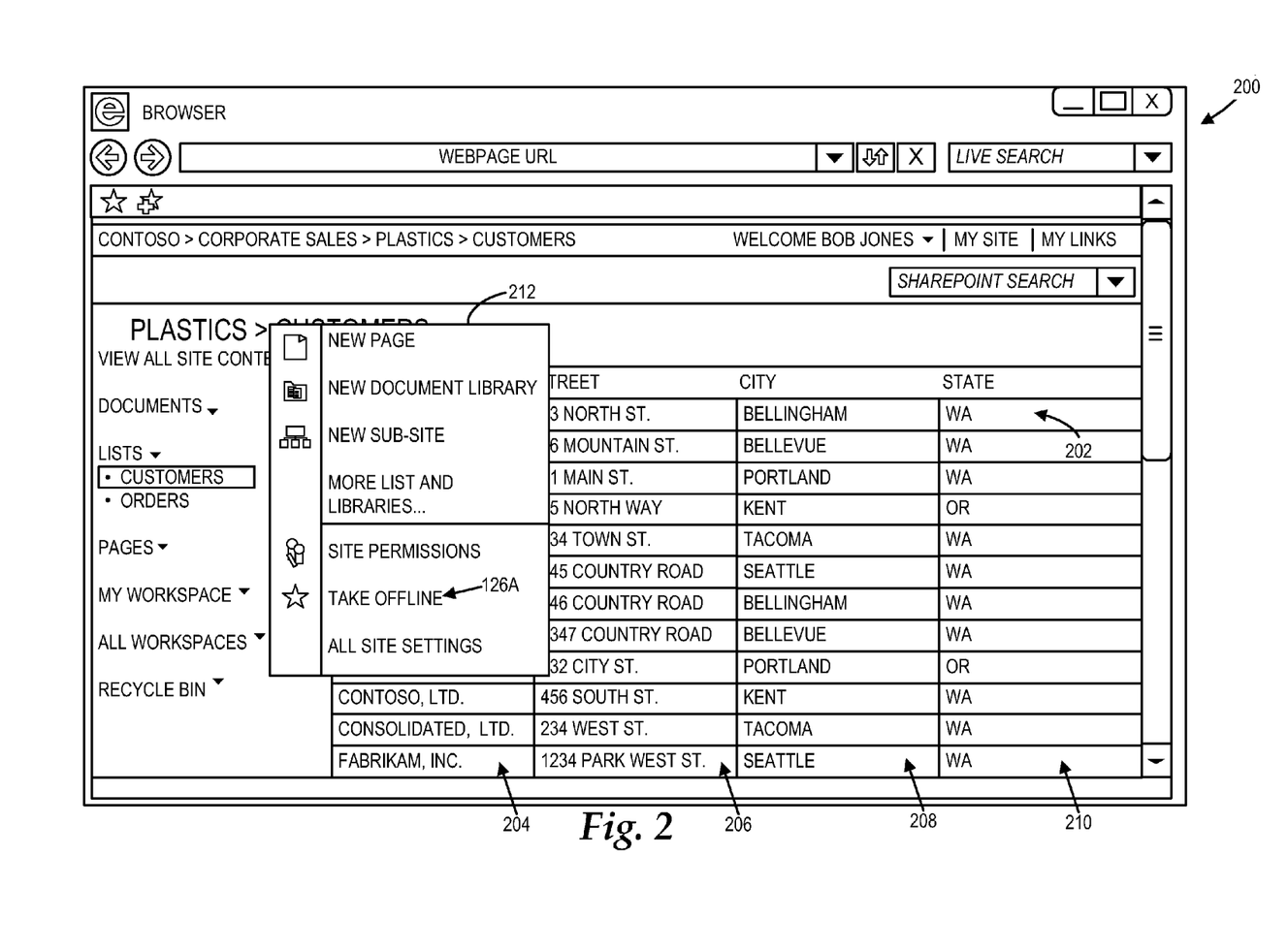
FIG. 2 is a screen capture diagram showing a server-side user interface for sending an instruction to take a solution artifact offline, in accordance with one embodiment.
Figure 3:
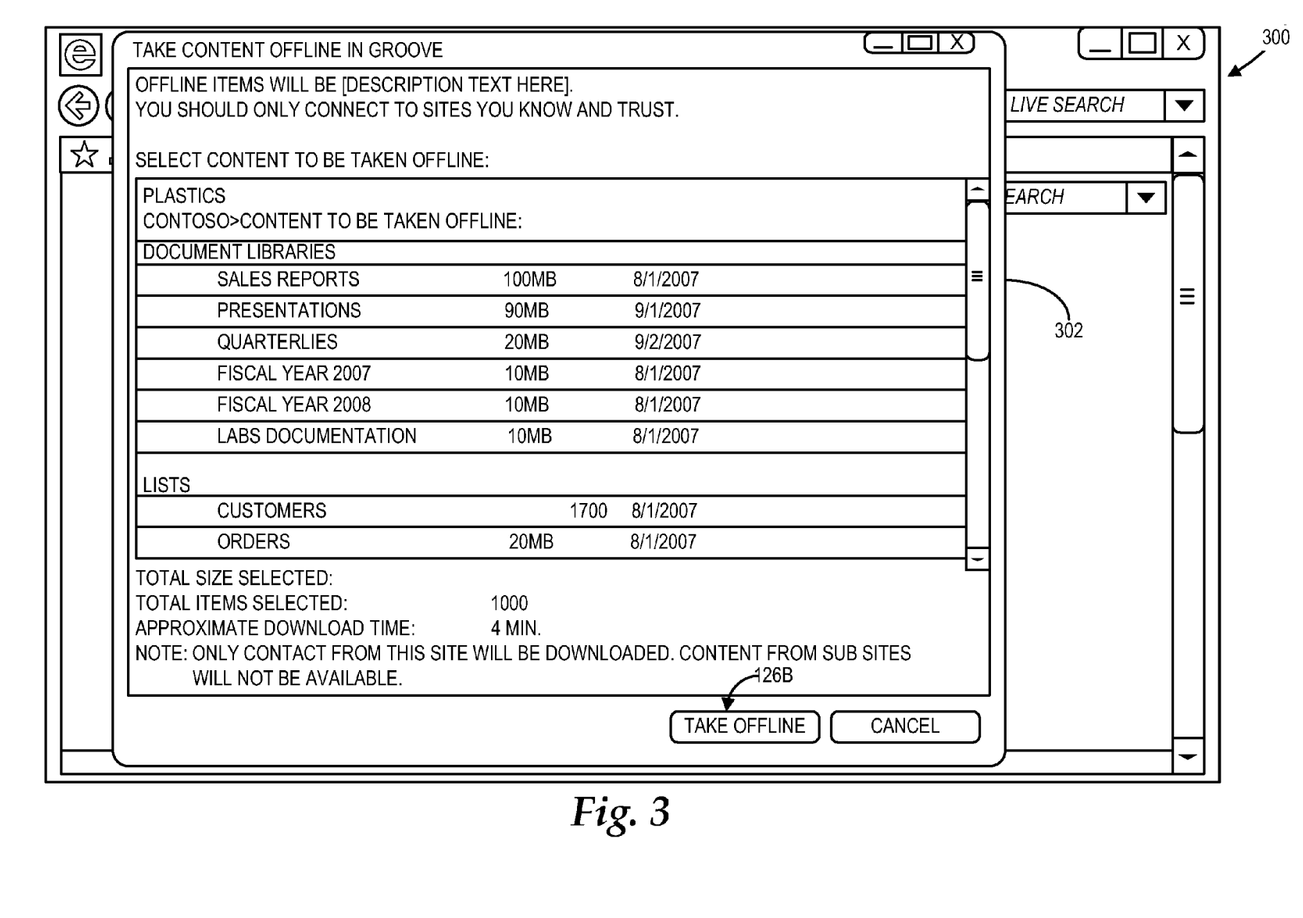
FIG. 3 is a screen capture diagram showing a client-side user interface for sending an instruction to take a solution artifact offline, in accordance with one embodiment.

Referring now to FIGS. 2 and 3, additional details will be provided regarding illustrative implementations of the deployment initiating element 126. In particular, FIG. 2 illustrates an exemplary screen capture diagram 200 of the server-side user interface 108A. As shown in FIG. 2, the screen capture diagram 200 includes a data list 202 comprising representations of a customer name 204, a street address 206, a city 208, and a state 210. The screen capture diagram 200 further includes a drop-down menu 212, which includes various options enabling an administrator or other suitable user at the server computer 102 to perform a number of tasks. One of the options provided through the drop-down menu 212 is an illustrative implementation of the deployment initiating element 126A. As previously discussed, a user can activate the deployment initiating element 126A in order to initiate the operation of the deployment mechanism 110 with respect to the data list 202.

Turning now to FIG. 3, an exemplary screen capture diagram 300 of the client-side user interface 108B is illustrated. As shown in FIG. 3, the screen capture diagram 300 includes an implementation of the deployment initiating element 126B. Although not so illustrated in FIG. 3, the client-side user interface 108B may enable a user at the client computer 104 to also view the data list 202. Upon viewing the data list 202, the user may access an offline menu 302 and activate the deployment initiating element 126B in order to initiate the operation of the deployment mechanism 110 with respect to the data list 202.

Figure 4:
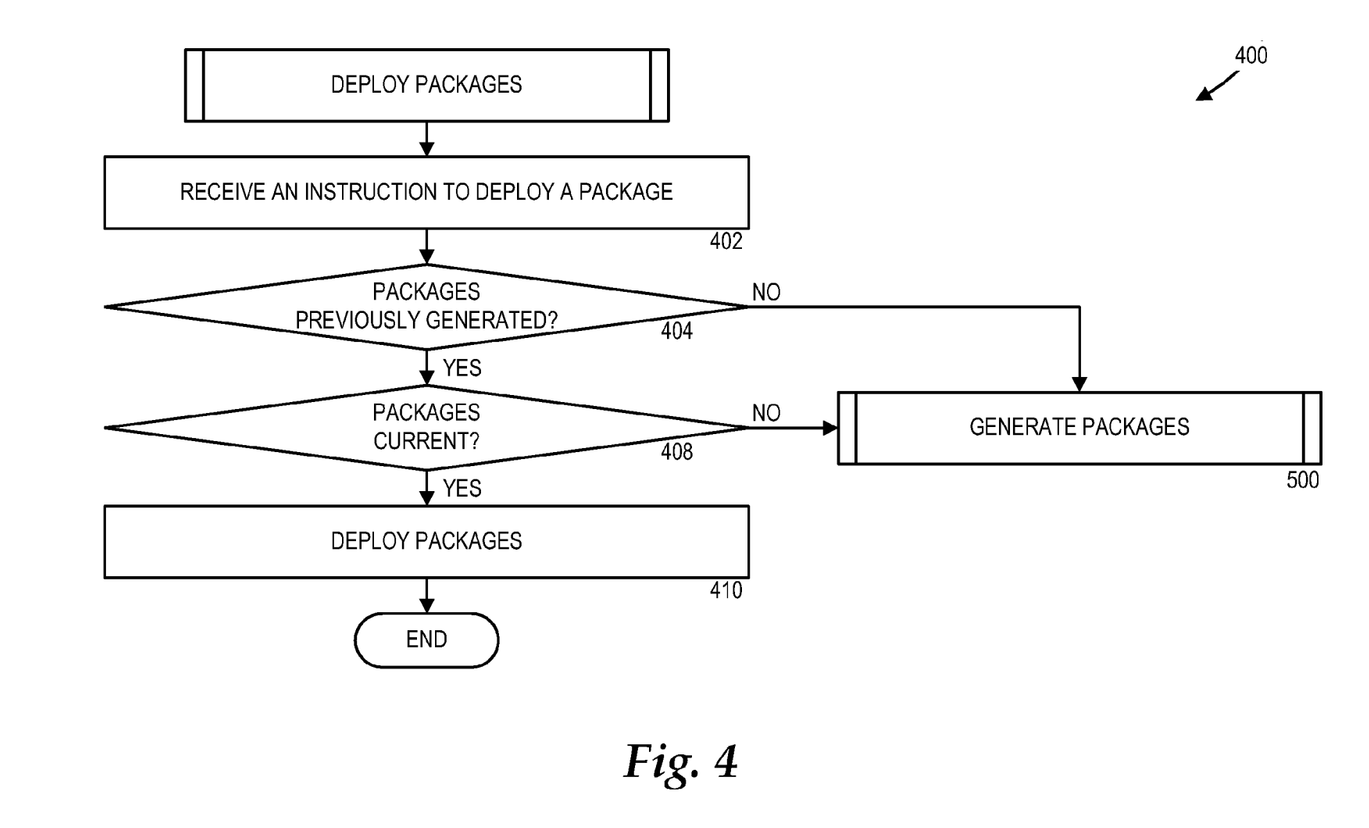
FIG. 4 is a flow diagram showing a method for deploying a solution artifact to a client-side application program, in accordance with one embodiment.
Figure 5:
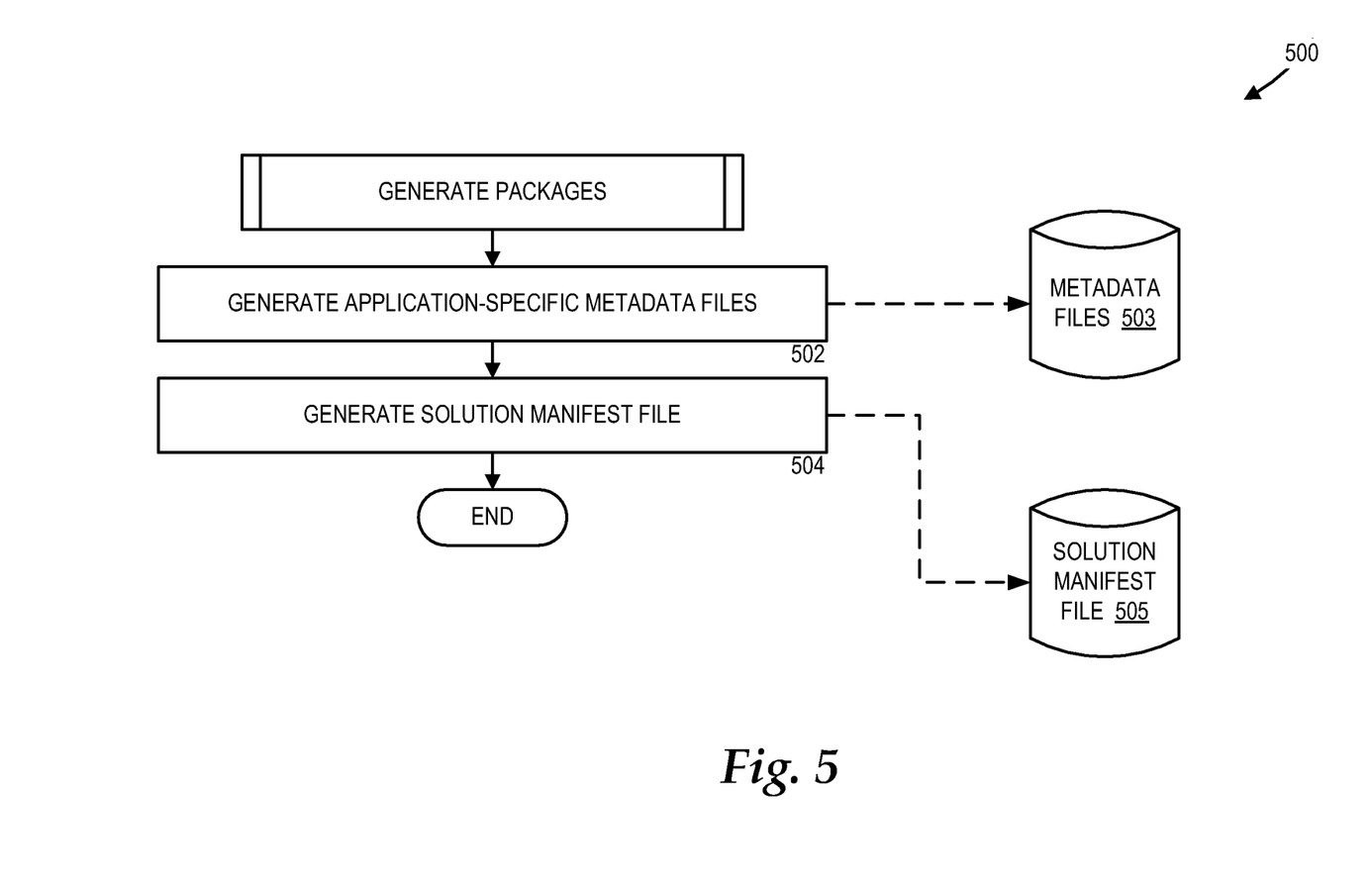
FIG. 5 is a flow diagram showing a method for generating a package for deployment to the client-side application program, in accordance with one embodiment.

Turning now to FIGS. 4 and 5, additional details will be provided regarding the operation of the deployment mechanism 110, the package generation module 112, and the deployment controller 113. In particular, FIG. 4 is a flow diagram illustrating one method provided herein for deploying a package, such as the packages 116. FIG. 5 is a flow diagram illustrating one method provided herein for generating a package, such as the packages 116. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Referring now to FIG. 4, a routine 400 begins at operation 402, where the deployment controller 113 receives an instruction to deploy a package, such as the packages 116, associated with a given collection of data, such as the solution artifact 120. For example, a user may transmit the instruction to the deployment controller 113 by activating the deployment initiating element 126 via a mouse, keyboard, or other suitable input device. In particular, the deployment initiating element 126 may be activated while the user is viewing the solution artifact 120 in order to generate and/or deploy the packages 116 associated with the solution artifact 120.

In one embodiment, the instruction transmitted to the deployment controller 113 may further include a selection of one or more application programs, such as the client applications 124, to which the deployment controller 113 will deploy the packages 116. In one embodiment, the user selects the application programs through the deployment initiating element 126. In other embodiments, the application programs are pre-selected by another suitable entity. Once the deployment controller 113 receives the instruction to deploy a package, the routine 400 proceeds to operation 404.

At operation 404, the deployment controller 113 determines whether a package, such as the packages 116, associated with the solution artifact 120 and the client applications 124 have been previously generated. In one embodiment, the deployment mechanism 110 may query the package database 114 to determine whether the packages exists. If the package does not exist, the routine 400 then proceeds to a routine 500, where the package generation module 112 generates the package. The routine 500 is described in greater detail below with respect to FIG. 5. If the package does exist, the routine 400 then proceeds to operation 408.

At operation 408, the deployment controller 113 determines whether the package that was been previously generated is current. In one embodiment, the deployment controller 113 determines whether the package is current by comparing the date that the package was generated with the date when the solution artifact 120 was last updated. If the date that the package was generated was after the date when the solution artifact 120 was last updated, then the deployment controller 113 determines that the package is current. If the date that the package was generated was before the data when the solution artifact 120 was last updated, then the deployment controller 113 determines that the package is not current. If the package is current, then the routine 400 proceeds to operation 410. If the package is not current, then the routine 400 proceeds to the routine 500, where the package generation module 112 generates the package, as described in greater detail below with respect to FIG. 5.

Referring now to FIG. 5, the routine 500 begins at operation 502, where the package generation module 112 generates application-specific metadata files, such as the application-specific metadata files 503, based on the solution artifact 120 and the client applications 124. For example, although the solution artifact 120 is being deployed to both of the client applications 124, the application-specific metadata files created for the first client application 124A may be different from the second client application 124B. According to embodiments, the applications-specific metadata files 503 include all suitable files that enable the client applications 124 to access (e.g., view, interact with, and modify) the same data as provided in the solution artifact 120. Upon creating the application-specific metadata files 503, the routine 500 proceeds to operation 504.

At operation 504, the package generation module 112 generates a solution manifest file, such as the solution manifest file 505. As used herein, the solution manifest file 505 defines the constituent parts of a solution, including its files, assemblies, code access security, web parts, features, site definitions, and other resources. In one embodiment, the solution manifest file 505 is an Extensible Markup Language ("XML") file that describes a deployment through the deployment mechanism 110, and in particular, identifies which of the packages 116 will be deployed to which client applications 124. The packages 116 may each include the associated application-specific metadata file 503 and the solution manifest file 505. During the deployment process, the solution manifest file 505 may reference a form, list, or other suitable collection of data that is not included in the packages 116. In this case, the package generation module 112 may generate a generic version of the collection of data and deploy the generic version as part of the solution. Upon generating the solution manifest file 505, the routine 500 returns to operation 410 of routine 400.

Referring again to FIG. 4, at operation 410, the deployment controller 113 deploys the packages 116 to the client applications 124 through the deployment mechanism 110. In one embodiment, the deployment mechanism 110 includes a CLICKONCE installer from MICROSOFT CORPORATION or other suitable deployment mechanism. The deployment controller 113 may instruct the deployment mechanism 110 to deploy the packages 116. Upon receiving the instruction from the deployment controller 113, the deployment mechanism 110 may download the packages 116 from the package database 114. For example, the instruction may include a uniform resource locator ("URL") indicating the location from which the deployment mechanism 110 can download the packages 116.

Upon downloading the packages 116 from the package database 114, the deployment mechanism 110 may deploy the packages 116 to the client applications 124. In one embodiment, the deployment mechanism 110 installs the packages 116 in a runtime catalog or other suitable storage device. The client applications 124 may then access the runtime catalog in order to retrieve the packages 116.

In one embodiment, the client applications 124 when executed may determine whether the packages stored in the runtime catalog are current. For example, the client applications 124 may compare the date of the packages stored in the runtime catalog with the date of the packages stored in the package database 114. If the date of the packages stored in the runtime catalog is the same as the date of the packages stored in the package database 114, then the packages stored in the runtime catalog are current. However, if the date of the packages stored in the runtime catalog is earlier than date of the packages stored in the package database 114, then the packages stored in the runtime catalog are not current.

Upon determining that the packages 116 stored in the runtime catalog are current, the client applications 124 are executed in a normal manner. Upon determining that the packages 116 stored in the runtime catalog are not current, the client applications 124 may download the new version of the packages 116 from the package database 114. Upon downloading the new version of the packages 116 from the package database 114, the client applications 124 are executed.

Figure 6:
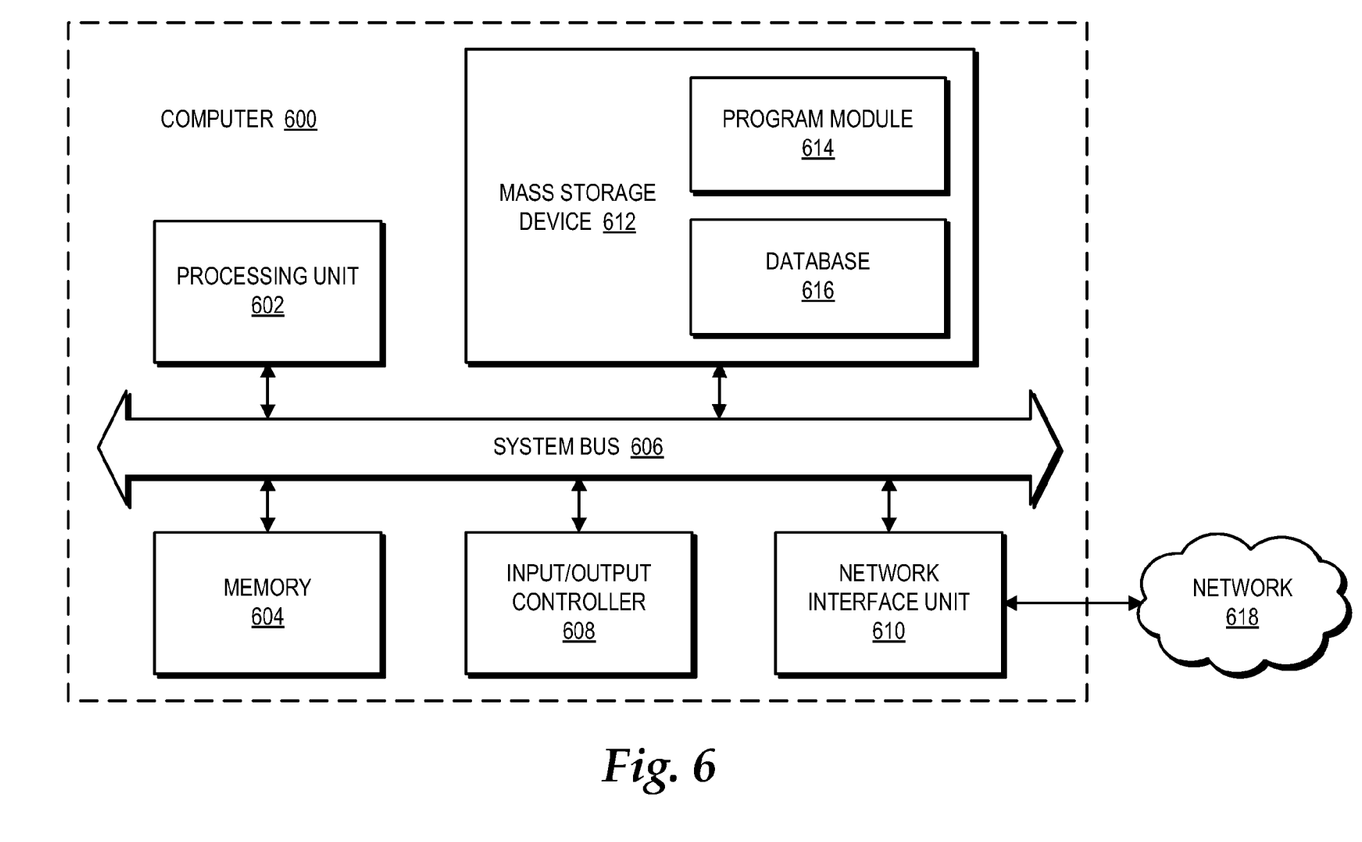
FIG. 6 is a computer architecture diagram showing an illustrative computer hardware architecture for a computing system capable of implementing the embodiments presented herein.

Referring now to FIG. 6, an exemplary computer architecture diagram showing a computer 600 is illustrated. Examples of the computer 600 may include the server computer 102 and the client computer 104. The computer 600 includes a processing unit 602 ("CPU"), a system memory 604, and a system bus 606 that couples the memory 604 to the CPU 602. The computer 600 further includes a mass storage device 612 for storing one or more program modules 614 and one or more databases 616. Examples of the program modules 614 may include the server-side user interface 108A, the deployment mechanism 110, the package generation module 112, the deployment controller 113, the client-side user interface 108B, and the client applications 124. An example of the databases 616 may include the package database 114 and the information database 118. The mass storage device 612 is connected to the CPU 602 through a mass storage controller (not shown) connected to the bus 606. The mass storage device 612 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules, or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY™, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 618. An example of the network 618 is the network 106. The computer 600 may connect to the network 618 through a network interface unit 610 connected to the bus 606. It should be appreciated that the network interface unit 610 may also be utilized to connect to other types of networks and remote computer systems. The computer 600 may also include an input/output controller 608 for receiving and processing input from a number of input devices (not shown), including a keyboard, a mouse, a microphone, and a game controller. Similarly, the input/output controller 608 may provide output to a display or other type of output device (not shown).

Based on the foregoing, it should be appreciated that technologies for deploying a solution artifact are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for deploying a server-side solution artifact to a client-side application program, comprising:

receiving an instruction to deploy the server-side solution artifact to the client-side application program, wherein the server-side solution artifact comprises a collection of organized data in a first representation, wherein the client-side application operates in a second representation, and wherein the client-side application is unable to interface with the collection of organized data in the first representation;

upon receiving the instruction, determining whether a package associated with the solution artifact and the client-side application program was previously generated, wherein the package comprises one or more application-specific metadata files and a solution manifest that enable the client-side application program operating in the second representation to access the collection of organized data in the first representation when the client-side application program is offline;

upon determining that the package was previously generated, determining whether the package is current;

upon determining that the package is not current or that the package was not previously generated, generating the package based on the solution artifact and the client-side application program, comprising:

generating the one or more application-specific metadata files associated with the solution artifact and the client-side application program, the one or more application-specific metadata files configured to be accessed by the client-side application program, the one or more application-specific metadata files containing the same collection of organized data as provided in the solution artifact; and generating the solution manifest, the solution manifest enabling the client-side application program to install the one or more application-specific metadata files; and upon determining that the package is current or upon generating the package, deploying the package to the client-side application program, wherein the client-side application program operating in the second representation uses the package to access the collection of organized data.

2. The method of claim 1, wherein the solution artifact comprises a list or a form.

3. The method of claim 1, wherein the client-side application program is incapable of accessing the solution artifact without the package.

4. The method of claim 3, wherein accessing the solution artifact comprises at least one of viewing, interfacing with, or modifying the collection of organized data associated with the solution artifact.

5. The method of claim 1, wherein receiving an instruction to deploy the solution artifact to the client-side application program comprises receiving, through a server-side user interface, the instruction to deploy the solution artifact to the client-side application program.

6. The method of claim 1, wherein receiving an instruction to deploy the solution artifact to the client-side application program comprises receiving, through a client-side user interface, the instruction to deploy the solution artifact to the client-side application program.

7. The method of claim 1, wherein determining whether a package associated with the solution artifact and the client-side application program was previously generated comprises querying a package database to determine whether the package database contains the package.

8. The method of claim 1, wherein determining whether the package is current comprises:

determining a first date when the package was generated;
determining a second date when the solution artifact was last updated;
determining whether the first date when the package was generated is before the second date when the solution artifact was last updated;
upon determining that the first date is before the second date, determining that the package is not current; and
upon determining that the first date is not before the second date, determining that the package is current.

9. The method of claim 1, wherein deploying the package to the client-side application program comprises providing the package to the client-side application program via a web server.

10. The method of claim 1, further comprising:

receiving a second instruction to deploy the solution artifact to a second client-side application program, wherein the second client-side application operates in a third representation;

upon receiving the second instruction, determining whether a second package associated with the solution artifact and the second client-side application program was previously generated, wherein the second package comprises one or more application-specific metadata files and a solution manifest for enabling the second client-side application program operating in the third representation to access the collection of organized data in the first representation;

upon determining that the second package was previously generated, determining whether the second package is current;

upon determining that the second package is not current or that the second package was not previously generated, generating the second package based on the solution artifact and the second client-side application program; and upon determining that the second package is current or upon generating the second package, deploying the second package to the second client-side application program.

11. A method for deploying a server-side solution artifact to a client-side application program, comprising:

receiving an instruction to take the solution artifact offline to the client-side application program, the solution artifact comprising web-based data in a first representation that is accessible through a web browser, the client-side application program operating in a second representation;

upon receiving the instruction, determining whether a package associated with the solution artifact and the client-side application program was previously generated, the package comprising one or more application-specific metadata files and a solution manifest that enable the client-side application program to access the web-based data in the first representation when the client-side application program operating in the second representation is offline, the client-side application program being incapable of accessing the solution artifact without the package;

upon determining that the package associated with the solution artifact and the client-side application program was previously generated, determining whether the package is current by comparing a first date at which the package was generated with a second date at which the solution artifact was last updated;

upon determining that the package is not current or that the package was not previously generated, generating the package based on the solution artifact and the client-side application program, comprising:

generating the one or more application-specific metadata files associated with the solution artifact and the client-side application program, the one or more application-specific metadata files configured to be accessed by the client-side application program, the one or more application-specific metadata files containing the same web-based data as provided in the solution artifact; and generating the solution manifest, the solution manifest enabling the client-side application program to install the one or more application-specific metadata files; and upon determining that the package is current or upon generating the package, deploying the package to the client-side application program, wherein the client-side application program operating in the second representation uses the package to access the web-based data.

12. The method of claim 11, wherein the solution artifact comprises a list or a form.

13. The method of claim 11, wherein receiving an instruction to take the solution artifact offline comprises receiving, through a server-side user interface, the instruction to deploy the solution artifact to the client-side application program.

14. The method of claim 11, wherein receiving an instruction to deploy the solution artifact to the client-side application program comprises receiving, through a client-side user interface, the instruction to deploy the solution artifact to the client-side application program.

15. The method of claim 11, wherein determining whether the package is current by comparing a first date when the package was generated with a second date when the solution artifact was last updated comprises:

determining whether the first date when the package was generated is before the second date when the solution artifact was last updated;

upon determining that the first date is before the second date, determining that the package is not current; and upon determining that the first date is not before the second date, determining that the package is current.

16. The method of claim 11, wherein deploying the package to the client-side application program comprises transmitting to the client-side application program a uniform resource locator (URL) for retrieving the package, and wherein the client-side application program, upon retrieving the package, executes the solution manifest to install the one or more application-specific metadata files on the client-side application program.

17. A computer memory having computer-executable instructions stored thereon which, when executed by a computer, cause the computer to:

receive, over a network, an instruction to take a solution artifact offline to a client-side application program, the solution artifact comprising a web-based list or form in a first representation that is accessible through a web browser;

upon receiving the instruction, determine whether a package associated with the solution artifact and a client-side application program was previously generated, the client-side application program operating in a second representation and being incapable of viewing, interfacing with, and modifying the solution artifact without the package;

upon determining that the package was previously generated, determine whether the package is current by comparing a first date when the package was generated with a second date when the solution artifact was last updated;

upon determining that the package is not current or that the package was not previously generated, generate the package based on the solution artifact and the client-side application program, the package comprising one or more application-specific metadata files and a solution manifest that enable the client-side application program operating in the second representation to access the web-based list or form in the first representation when the client-side application program is offline, the one or more application-specific metadata files associated with the solution artifact and the client-side application program, the one or more application-specific metadata files configured to be accessed by the client-side application program, the one or more application-specific metadata files containing the same data as provided in the solution artifact, the solution manifest enabling the client-side application program to install the one or more application-specific metadata files on the client-side application program; and upon determining that the package is current or upon generating the package, deploy, over the network, the package to the client-side application program, wherein the client-side application program operating in the second representation uses the package to access the web-based list or form.

18. The computer memory of claim 17, wherein to determine whether the package is current by comparing a first date when the package was generated with a second date when the solution artifact was last updated, the computer-executable instructions stored thereon which, when executed by a computer, further cause the computer to:

determine whether the first date when the package was generated is before the second date when the solution artifact was last updated;

upon determining that the first date is before the second date, determine that the package is not current; and upon determining that the first date is not before the second date, determine that the package is current.

* * * * *